(12) United States Patent
Asim et al.

(10) Patent No.: US 9,519,799 B2
(45) Date of Patent: Dec. 13, 2016

(54) DYNAMIC DETERMINATION OF ACCESS RIGHTS

(75) Inventors: Muhammad Asim, Eindhoven (NL); Milan Petkovic, Eindhoven (NL); Jin Qu, Shanghai (CN)

(73) Assignee: Koninklijke Philips N.V., Eindhoven (NL)

( * ) Notice: Subject to any disclaimer, the term of this patent is extended or adjusted under 35 U.S.C. 154(b) by 137 days.

(21) Appl. No.: 13/318,493

(22) PCT Filed: May 28, 2010

(86) PCT No.: PCT/IB2010/052392
§ 371 (c)(1),
(2), (4) Date: Nov. 2, 2011

(87) PCT Pub. No.: WO2010/140098
PCT Pub. Date: Dec. 9, 2010

(65) Prior Publication Data
US 2012/0054826 A1    Mar. 1, 2012

(30) Foreign Application Priority Data
Jun. 1, 2009  (CN) .......................... 2009 1 0145310

(51) Int. Cl.
*G06F 17/30*   (2006.01)
*G06F 21/62*   (2013.01)

(52) U.S. Cl.
CPC ................................ *G06F 21/6245* (2013.01)

(58) Field of Classification Search
CPC  G06F 21/10; G06F 2221/2113; G06F 19/322; G06F 21/6245; G06F 21/60; G06F 21/6227; H04L 63/08; H04L 63/10; H04L 2463/101; H04L 2209/60; H04L 12/585; H04L 51/12; H04W 12/06; H04W 4/18
See application file for complete search history.

(56) References Cited

U.S. PATENT DOCUMENTS

| | | | |
|---|---|---|---|
| 7,086,085 B1 * | 8/2006 | Brown | G06F 21/6218 714/E11.207 |
| 7,299,504 B1 | 11/2007 | Tiller et al. | |
| 2004/0083394 A1 * | 4/2004 | Brebner | G06F 21/31 726/19 |
| 2004/0236725 A1 * | 11/2004 | Amitay | G06F 17/30672 |
| 2004/0268154 A1 | 12/2004 | Ullrich | |
| 2005/0021369 A1 | 1/2005 | Cohen | |

(Continued)

FOREIGN PATENT DOCUMENTS

| | | |
|---|---|---|
| CN | 1805449 A | 7/2006 |
| WO | 0057339 A2 | 9/2000 |

(Continued)

*Primary Examiner* — Mohammed Waliullah

(57) ABSTRACT

A method of dynamically determining the access rights of a client to a record comprises receiving an access request from the client with respect to the record, determining one or more contexts relating to the access request, calculating a score for each determined context, calculating an overall score from the context scores, accessing a rights policy for the record, the rights policy defining a plurality of different rights with respect to the record, each with a respective minimum score, and determining the client's access rights according to a comparison of the overall score to the score for each right in the rights policy.

12 Claims, 5 Drawing Sheets

(56) References Cited

U.S. PATENT DOCUMENTS

| | | | |
|---|---|---|---|
| 2007/0078677 A1 | 4/2007 | Hofstetter | |
| 2007/0143827 A1 | 6/2007 | Nicodemus et al. | |
| 2008/0189761 A1 | 8/2008 | Brodie et al. | |
| 2009/0006856 A1* | 1/2009 | Abraham et al. | 713/183 |
| 2009/0025057 A1* | 1/2009 | Mattsson | 726/1 |
| 2009/0048855 A1* | 2/2009 | Falk et al. | 705/1 |
| 2009/0300720 A1* | 12/2009 | Guo | G06Q 10/107 726/3 |
| 2011/0314549 A1* | 12/2011 | Song et al. | 726/25 |

FOREIGN PATENT DOCUMENTS

| | | |
|---|---|---|
| WO | 2006065633 A | 6/2006 |
| WO | 2007105148 A2 | 9/2007 |
| WO | 2008060320 A2 | 5/2008 |
| WO | 2009006260 A2 | 1/2009 |

\* cited by examiner

DYNAMIC DETERMINATION OF ACCESS RIGHTS

TECHNICAL FIELD OF THE INVENTION

This invention relates to a method of, and system for, dynamically determining the access rights of a client to a record. In one embodiment, the invention provides a dynamic change of rights in a DRM or XACML system based on the trustworthiness of the context information and/or on a need-to-know basis.

BACKGROUND TO THE INVENTION

With advances in medical information technology, patients and doctors can now benefit from different services. For example, an Electronic Patient Record (EPR) is a repository for electronically stored data related to patients' health status and health care. An EPR system can provide functions to improve the quality and the efficiency of healthcare delivery. Examples of EPR's functionality are providing reminders and alerts, offering access to multiple clinicians at the same time, or linking knowledge sources to a patient's data. Traditional paper-based medical records lack such functions.

In addition, there is an increasing demand for the remote patient monitoring services, hence a number of standardisation activities are aiming at this area such as the Continua Alliance (see www.continuaalliance.org/home) and the Healthcare Information Technology Standards Panel (see www.hitsp.org). Some of the advantages of communicating health related problems electronically include not having to leave the house, which may be an issue for disabled people, asking delicate questions anonymously, or obtaining answers from individuals who one would not have been met otherwise. Although these technologies bring in a number of advantages, however, at the same time, a number of security and privacy issues arise.

Health related data is generally considered as very private, which justifies the existence of extensive legislation and well established ethical principles such as Hippocratic Oath. The European Directive 94/46, the Health Insurance Portability and Accountability Act in the USA (see www.hhs.gov/ocr/privacysummary.pdf) as well as the Health Information Protection Act (see www.health.gov.sk.ca/hipa-checklist) in Canada, legislate the rights of individuals and obligations of trustees such as doctors and nurses in the health system, with respect to personal health information. These acts apply to personal health information in a health system in any form, including traditional paper records and electronic records. The basic goal of the legislation is to protect the privacy of personal health information, while at the same time ensuring that information is available, as needed, to provide services and to monitor, evaluate and improve the health system for the benefit of individuals and the community.

The various legislation require the implementation of a wide range of security measures. One of the main principles is referred to as information minimisation. For example, the HIPA (Health Information Protection Act) specifies the requirement to collect, use or disclose on a need-to-know basis only. The Act requires that personal health information is collected, used or disclosed only on a need-to-know basis. This means that only information that is required for an acceptable purpose should be collected, used or disclosed. It also means that only those individuals who need to access the information for legitimate purposes, under the Act, should have access to the records.

Next to the need-to-know condition, another important factor to determine access rights is certainty in the subject's contextual attributes. In healthcare applications, the access to information very often depends on context information (context attributes are very often used as conditions in access control rules). However, in the process of evaluating rules, very often it is difficult to be 100% sure if a certain context is fulfilled. This is especially the case for DRM (digital rights management) applications, where the client has to evaluate context information. State-of-the-art solutions, such as XACML (eXtensible Access Control Markup Language), take into account context attributes, but they are based on a static authorisation.

A doctor for example, would have the same access rights to his patients' health records from any device (office PC, Home PC, public Internet Café) using any type of authentication method (such as one or two factor authentication). The doctor can access the private health information records of a patient from a PC at a public internet cafe or at his home with the same access rights as he would have when accessing the records from a secure PC at the hospital or at his clinic. However, the certainty in the doctor's attributes (for example his identity) depends a lot on methods used to certify these attributes (for example authentication modalities used).

The same is true for the certainty in other contextual information such as the trustworthiness of PC running a Digital Rights Management or an Access Control client application. However the current static authorisation methods cannot cope with these requirements. Hence there is a need for methods to efficiently determine the certainty in the attributes used for access control and DRM as well as the need-to-know condition, which will be used to accordingly assign the access and usage rights to the authorised person.

SUMMARY OF THE INVENTION

It is therefore an object of the invention to improve upon the known art.

According to a first aspect of the present invention, there is provided a method of dynamically determining the access rights of a client to a record comprising receiving an access request from the client with respect to the record, determining one or more contexts relating to the access request, calculating a score for each determined context, calculating an overall score from the context scores, accessing a rights policy for the record, the rights policy defining a plurality of different rights with respect to the record, each with a respective minimum score, and determining the client's access rights according to a comparison of the overall score to the score for each right in the rights policy.

According to a second aspect of the present invention, there is provided a system for dynamically determining the access rights of a client to a record comprising a license server arranged to store a rights policy for the record, the rights policy defining a plurality of different rights with respect to the record, each with a respective minimum score, a component arranged to receive an access request with respect to the record, and a context evaluator arranged to determine one or more contexts relating to the access request, to calculate a score for each determined context, to calculate an overall score from the context scores, to access the rights policy for the record, and to determine the client's access rights according to a comparison of the overall score to the score for each right in the rights policy.

Owing to the invention, it is possible to provide a method and system where the access and usage rights of the private electronic health information records are dynamically changed based on the trustworthiness of the context information and/or on the need-to-know concept. Before making a decision and enforcing a license (policy), the DRM client or an AC (access control) system will make a request for the certainty (or trustworthiness) level of the context information from a context evaluator. The context evaluator collects the appropriate context information and assigns trust scores to each of them. After assigning the individual trust scores, the overall trust score is computed which is then forwarded to the DRM client or PDP (Policy Decision Point) of an AC system, which minimises (reduces) the original access and usage rights based on the level of the trust score.

Preferably, the step of calculating an overall score from the context scores comprises calculating an average of the context scores. In one embodiment, the average is a weighted average according to a predefined formula. The individual context scores need to be combined into a single context score which represents the overall trustworthiness of the current application to the patient's data record. A simple average or weighted average can be used to combine the different context scores into a single overall score. This provides a simple and efficient method by which an overall measure can be calculated of the total trustworthiness of the current application to the health record, given all of the different circumstances surrounding the application.

Advantageously, the step of determining one or more contexts relating to the access request comprises selecting one or more contexts of authentication level, trustworthiness of client and access time. Any number of different contexts can be used in the determination of the access rights of the client to the data record. Such contexts as authentication level (whether a password, smart card or biometric measurement was used, for example) and the trustworthiness of the client machine (whether it is a hospital computer or a computer in an Internet cafe, for example) can be used to determine the overall context score in a reliable and consistent manner.

In one embodiment, the step of calculating a score for each determined context comprises assigning a descriptive value to each context. In this case, the step of calculating an overall score from the context scores comprises applying a rules policy to the descriptive values to obtain an overall score that comprises a descriptive value. The calculation of a score for each context and then the calculation of an overall score from the individual context scores do not necessarily have to be carried out using numerical values. A score could be a weighting on any kind of scale, not just a numerical scale. For example, the score for a context could be selected from descriptive values such as very low, low, medium, high and very high, and the calculation of the overall score could then be made on the same scale, using a rules policy such as the most commonly occurring term, for example.

BRIEF DESCRIPTION OF THE DRAWINGS

Embodiments of the present invention will now be described, by way of example only, with reference to the accompanying drawings, in which.

DETAILED DESCRIPTION OF THE PREFERRED EMBODIMENTS

Private health information needs only to be disclosed taking into account the need-to-know criteria as well as the certainty of the evaluated context and subject attributes. In the system, there is delivered a method where the access control and/or the usage rights for accessing a particular health information record are changed dynamically based on the certainty/trustworthiness of the context information. This dynamic change can also be applied using the level of the need to know the private health information.

The essential idea is to dynamically change (minimise) the access control and/or usage rights of a client for accessing private health information records. This is done based on the certainty level of attributes used in the evaluation of a license or access control policy. The certainty level can be assigned to each contextual attribute for example as {subject ID, certainty 0.33}, or it can be calculated based on other context attributes. It is also possible to change access rights based on the level of the intensity of the need-to-know condition.

Figure 1:
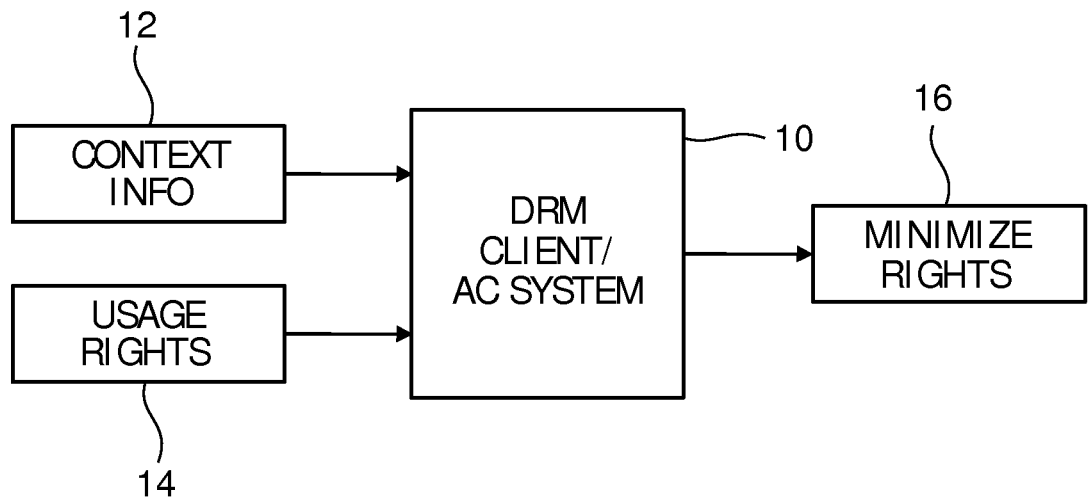
FIG. 1 is a schematic diagram of a system.

This approach has the following advantages. Firstly, privacy is better protected, and therefore a requirement from the related legislation is implemented in an efficient manner. The original rights for accessing the information will be maintained providing the person who is accessing the information really needs it, which is automatically determined. The system minimises the security threats by minimising the usage rights based on the certainty of the context information. However, the proposed method and system still preserve the flexibility of accessing the private health information records. For example, a doctor can access the information at their home or at a public internet cafe although with the minimised rights. Note that the level of the minimisation can be determined by a policy defined by an appropriate authority or the subject of the information. FIG. 1 is a high level conceptual diagram of the system, where the DRM client 10 receives the usage rights 14 and trustworthiness scores of context information 12. Hence based on the trustworthiness scores of context information 12, the original usage rights 14 are being minimised, and the appropriate output 16 shows the reduced rights.

Figure 2:
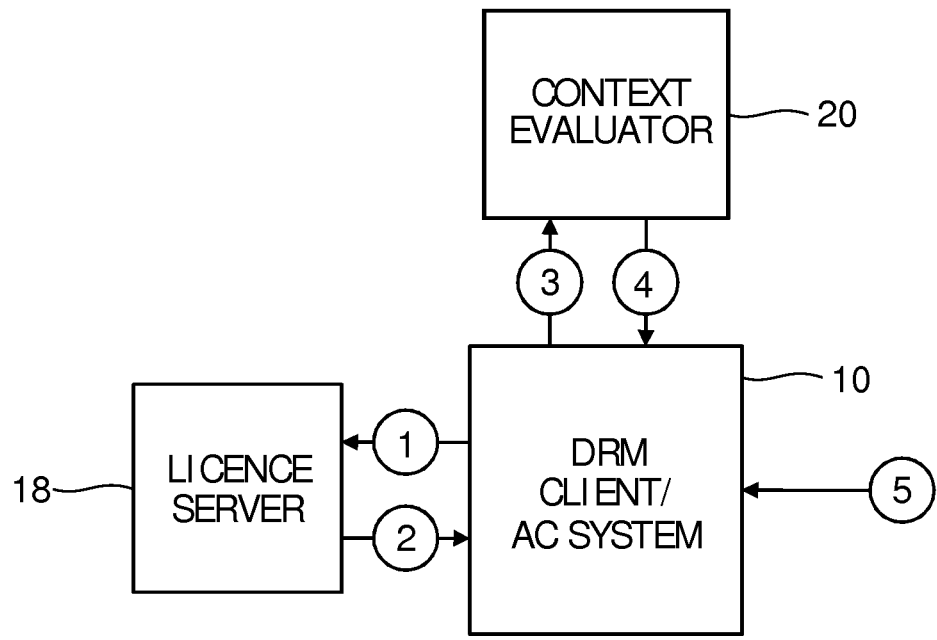
FIG. 2 is a further schematic diagram of the system, showing more detail.

FIG. 2 is the more detailed description of the system. At step (1), the DRM client 10 requests from a license server 18 the rights for a particular asset (or resource), which is the record that the client wishes to access. At step (2), the license server 18 sends the DRM client 10 the original rights and conditions for the particular asset together with the minimisation policy. At step (3), the DRM client 10 requests the trustworthiness of the context information from a context evaluator 20. The context evaluator 20 assigns trustworthiness scores to each of the individual context information from each broad category of the context information and calculates an overall (such as the average) trustworthiness score. Alternatively, the DRM client 10 can assign these values itself based on other context information. At step (4), the context evaluator 20 forwards the trustworthiness (or certainty score) of the context information to the DRM client 10. At step (5), the DRM client 10 minimises the rights based on the trustworthiness score and assigns the minimised rights to the subject for that particular access.

The system provides a method for minimisation of rights in a DRM system. Below is given a construction of how the rights will be minimised based on the certainty in the different categories of the available context information, although, it is possible to use other different levels of context information. Many different things can be used as a context in relation to the access to the patient's health record. Such things as location of the machine making the access request or the time of day and so on can be used as a context in relation to the access request. Each context that is used is scored individually before an overall score for all of the contexts used is calculated.

Figure 3:
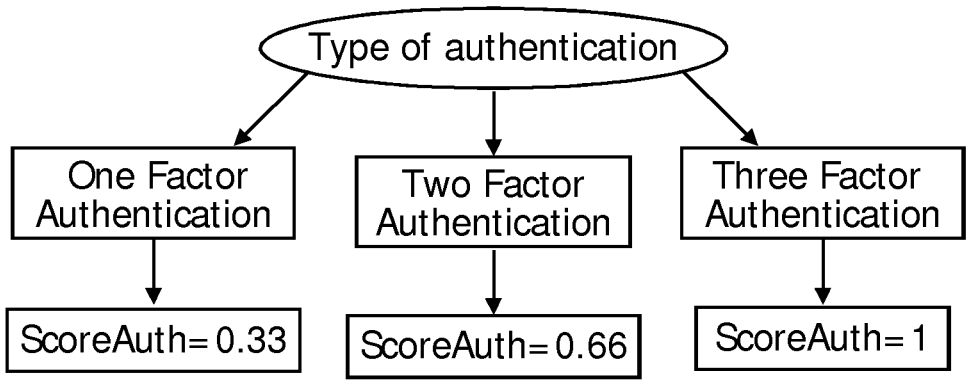
FIGS. 3 to 5 are schematic diagrams of context scoring schemes.

Context information can be related to the type of authentication that is being used by the client making the access request. A first category of the context information that the context evaluator could use to determine trustworthiness is the type of authentication used for accessing private health information records. FIG. 3 shows different types of authentication and their corresponding scores. If a person is using only one factor authentication, then the certainty score assigned to it will be low, however if a person uses two factor authentication then certainty score assigned to it will be relatively high. Consequentially, for the three factor authentication the certainty will be highest.

FIG. 3 shows the different types of authentication used in order to access the information, hence based on the type of authentication used to access the private health information records, a certainty (or trustworthiness) score is assigned, which is later used in the minimisation of the usage rights. It shows different level of certainty the system is talking to the right user, that is, how much the system is certain that the access request comes from the real user.

Figure 4:
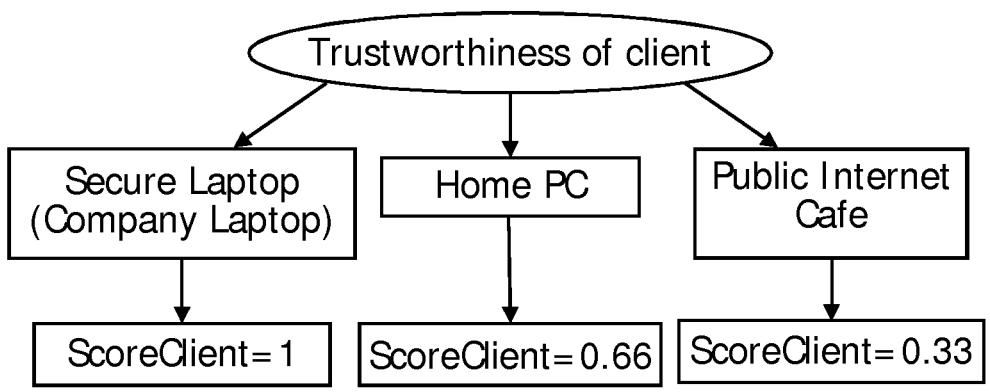

Another context information category could be related to the client maliciousness, shown in FIG. 4. This shows the trustworthiness (or certainty) scores of client that is requesting access to the private health information records. The second category of the context information that could be considered is the trustworthiness of the DRM client that is requesting the access to the private health information. For example, the doctor may be accessing the information record from their office using their office PC, or using company laptop from his home. In this case, the trustworthiness of the client will be high and hence the score assigned to it will be highest. However, if the doctor is trying to access the information from their home PC, then trustworthiness of the DRM client will be lower, and hence the score assigned to it will be relatively low. If the doctor is accessing the information from a public internet café, trustworthiness of the client will be very low and the score assigned to it will be lowest. FIG. 4 shows the trustworthiness of the different clients from where the information could be accessed and their corresponding certainty (or trustworthiness) scores assigned to them (the probability that the client is not malicious).

Figure 5:
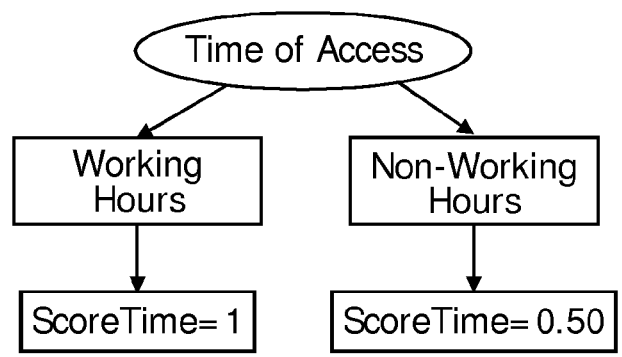

Context information can also be related to time of access. A third category of the context information that could play a role is the time of accessing the private health information. This could be helpful in determining the need-to-know requirement. For example, if certain information is accessed during normal working hours, then the probability that it is really needed and would be used for the right purpose might be high, however, if the information is tried to be accessed in non-working hours, then the probability that it would be used for the right purpose and that it is really needed, would be relatively low. FIG. 5 shows two different time intervals of accessing the information and their corresponding certainty (or trustworthiness scores).

In the above section, in computing the trustworthiness (or certainty) scores, there is a focus on three different major categories of the context information and this is used to show how they can be helpful in determining the certainty (or trustworthiness) in different contextual attributes as well as the level of need-to-know. In the section below is given one method of how the knowledge from these three aspects or contexts can be combined to obtain the overall trust scores (or trustworthiness) scores.

After collecting different types of context information and assigning a trust score to each of them individually, one way to calculate the overall trustworthiness score is to combine the trust scores of each of the individual context information from each category and normalise them. For example, if the doctor is accessing the private health information during non-working hours from their home PC, using two factor authentication, then the overall trustworthiness score would then be calculated as follows:

$$Trust\_Score = (ScoreAuth + ScoreLoc + ScoreTime)/3$$

$$Trust\_Score = (0.66 + 0.66 + 0.5)/3 = 0.6067.$$

The above trustworthiness score "Trust_Score" is calculated at the context evaluator 20 or alternatively at the DRM Client 10. Then, based on the value of Trust_Score, the original usage rights are minimised. For example, if the original usage rights defined by the rights policy are rights={view, modify, print, forward, delegate, delete}, then based on the trust score, the rights could be minimised as follow. The DRM client 20 receives from the license issuer a threshold value from the interval [0, 1] to each of the rights as follows {View→0.2, modify→0.5, print→0.6, forward→0.7, delegate→0.8, delete→0.9}. The rights policy defines a plurality of different rights with respect to the record being accessed, each with a respective minimum score.

Based on the calculated Trust_Score (0.6067), the DRM client allows the user to execute only the rights for which assigned threshold value is below the Trust_Score, i.e. 0.6067 in the above example. So the minimised (executable) usage rights will be as given below, executable Rights={view, modify, print}. This shows how for the given context of the doctor accessing a health record from their home PC out of hours, using two-factor authentication, then their determined access rights will be to view, modify and print the record. The other access rights of forward, delegate and delete are denied to doctor in the specific context. This illustrates the central concept of the rights being minimised.

Figure 6:
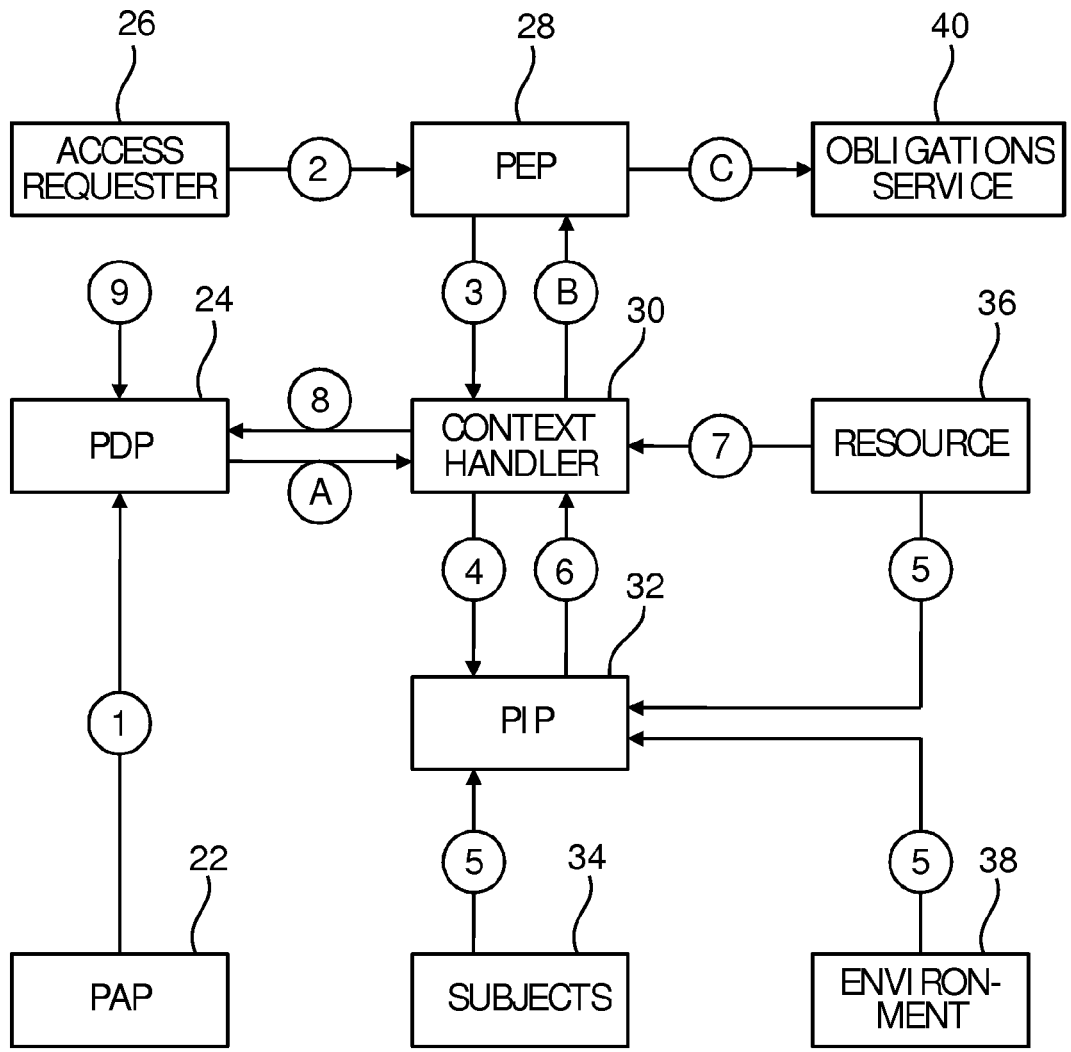
FIG. 6 is a schematic diagram of data flow in an XACML system.

The minimisation of rights (or actions) in an XACML system, based on the trustworthiness or the need-to-know concept, is illustrated in FIG. 6. In the following there will be briefly described how the above concept of minimisation of rights will work for an XACML system. Firstly, it is important to note that in the XACML system, the rights are being referred as actions. Hence from here on, actions and rights will be considered as equivalent to each other. The data flow diagram of the XACML system is shown in FIG. 6. There will be briefly described each and every step of the data flow diagram and also explained at which block diagram and at which step the rights could be minimised based on the trustworthiness of the context information.

At step (1) a PAP 22 (policy administration point) write policies and policy sets and make them available to a PDP 24 (policy decision point). These policies or policy sets represent the complete policy for a specified target. It is assumed that the policy is extended to contain thresholds for each action. At step (2) an access requester 26 sends a request for access to a PEP 28 (policy enforcement point). At step (3) the PEP 28 sends the request for access to a context handler 30 in its native request format, optionally including attributes of the subjects, resource, action and environment.

At step (4), the context handler 30 requests the attributes or context information from a PIP 32 (policy information point). At step (5) the PIP 32 obtains the requested attributes and different categories of the context information from subjects 24, resource 36 and environment 38. At step (6) the PIP 32 returns the requested attributes to the context handler 30. It is assumed that the PIP 32 attaches certainty information to each attribute. Alternatively, certainty information can be calculated by the context handler 30 based on other context attributes. At step (7) optionally, the context handler 30 includes the resource 36 in the context.

At step (8), the context handler 30 constructs an XACML request context and sends it to the PDP 24. Here the PDP 24 could be viewed as equivalent to a DRM client 10, and the context handler 30 could be viewed as equivalent to the context evaluator 20. The PDP 9 requests any additional subject, resource, action, and environment attributes from the context handler 30, if required. If the certainty information is not already assigned to the attributes, then the context handler 30 assigns the trust scores to each of the attribute from each category of the context information and calculates the average trust worthiness score. This is then forwarded to PDP 24 along with other subject, resource, action and environment attributes.

At step (9) the PDP 24 evaluates the policy and minimises the original usage rights (or actions in the XACML language) based on the overall trustworthiness score. The assignment of the trustworthiness scores to each attribute from each category of the context information could also be done at PDP 24 rather than at context handler 30 and average trustworthiness scores will be calculated based on which the original usage rights (or actions) could be minimised. At step (10, labelled A) the PDP 24 returns the response context (including the authorisation decision) to the context handler 30. At step (11, labelled B) the context handler 30 translates the response context to the native response format of the PEP 28. The context handler 30 returns the response to the PEP 28. At step (12, labelled C) the PEP 28 fulfils the obligations with respect to the obligations service 40.

Context information could also be evaluated at the DRM server side rather than on the client side. After evaluating the certainty of the context information, the original usage rights are correspondingly minimised. Hence in this case the data with the limited usage rights will then be forwarded to the DRM Client. Although the above has considered three different major categories of the context information, it is possible to consider other categories of the context information such as emergency situation etc. Although, there is given one, preferred, method for the calculation of the overall trust score, however there could be any number of other different methods for calculating overall trust score from the statically assigned individual trust scores of the context information.

Figure 7:
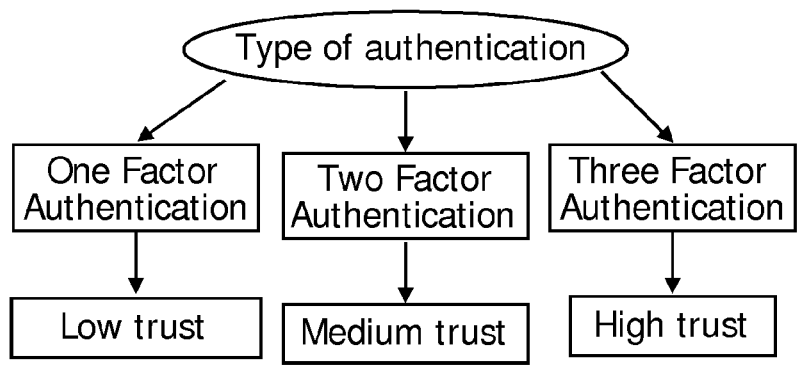
FIG. 7 is a schematic diagram of an alternative context scoring scheme.

Instead of assigning the static trust scores to the context information and then calculating the overall (average) trustworthiness, it is possible to use different descriptive values to indicate the trust in each of the different context information, rather than a numerical score, such as shown in FIG. 7. This Figure shows type of authentication and their corresponding descriptive trust scores. The same could be done for the other categories of the context information. The overall trustworthiness could be calculated based on arbitrary rules defined by the policy, such if trustworthiness level of two context information is medium and other one is low, then the final trustworthiness level would be medium. Similarly there could be other rules which combines the trust in each context information and produces the final trustworthiness level. Hence based on the final trustworthiness level i.e. low trust, medium trust, and high trust, original usage rights can be minimised.

Instead of calculating the average Trust_Score, it is possible to compute a weighted average based on the importance of each category of the context information. Each category is assigned a weight, for example, the weight of "Type of Authentication"=0.5, weight of "Trustworthiness of Client"=0.3, weight of "Time of Access"=0.2. Reusing the previous example again of the doctor accessing the private health information during the non-working hours from his home PC using two factor authentication, then the trustworthiness score could then be calculated as follows:

$$Weighted\_Trust\_Score=(0.5*ScoreAuth+0.3*ScoreClient+0.2*ScoreTime)/(0.5+0.3+0.2)$$

$$Weighted\_Trust\_Score=(0.5*0.66+0.3*66+0.2*0.5)/1$$

$$Weighted\_Trust\_Score=(0.33+0.198+0.1)/1=0.2093.$$

Figure 8:
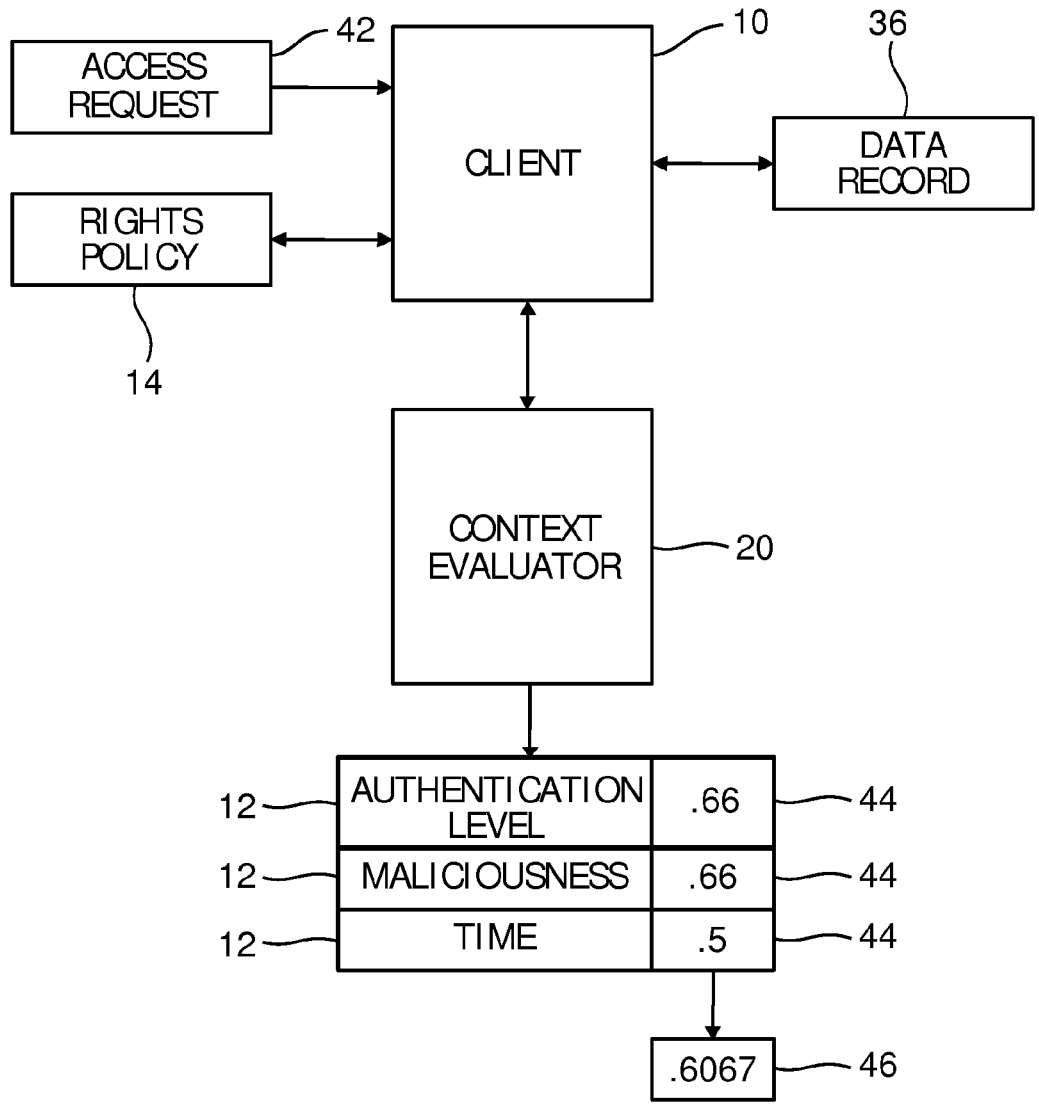
FIG. 8 is a further schematic diagram of the system.

FIG. 8 illustrates the specific example of the doctor accessing the private health information during the non-working hours from his home PC using two factor authentication, but with a non-weighted average used for the calculation of the overall score. An access request 42 is made to the DRM client 10 in relation to the data record 36 of a patient. The client 10 also has access to the rights policy 14 for that data record 36. The client 10 is connected to the context evaluator 20, although the DRM client 10 itself could implement the functionality of the context evaluator 20. The context evaluator will make calculations that will result in a minimisation of the access rights of the client making the request 42.

The context evaluator 20 determines one or more contexts 12 relating to the access request 42 and calculates a score 44 for each determined context 12. The score represents a level of trust in the context according to the information derived about that specific context. The context evaluator 20 calculates an overall score 46 from the context scores 44, in this case a straight average of the scores 44. The context evaluator 20 accesses the rights policy 14 for the record 36. The rights policy 14 defines a plurality of different rights with respect to the record 36, each of which has a respective minimum score, and the context evaluator 20 determines the client's access rights according to a comparison of the overall score 46 to the score for each right in the rights policy 14.

The calculation of a score for each context and then the calculation of an overall score from the individual context scores do not necessarily have to be carried out using numerical values. A score could be a weighting on any kind of scale, not just a numerical scale. For example, the score for a context could be selected from very low, low, medium, high and very high, and the calculation of the overall score could then be made on the same scale, using the most commonly occurring term, for example. Indeed different scoring scales could be used for different contexts, as long as the calculation of the overall score uses an algorithm that can handle the different input parameters and provide a meaningful result that represents an overall confidence score for the combined contexts.

Figure 9:
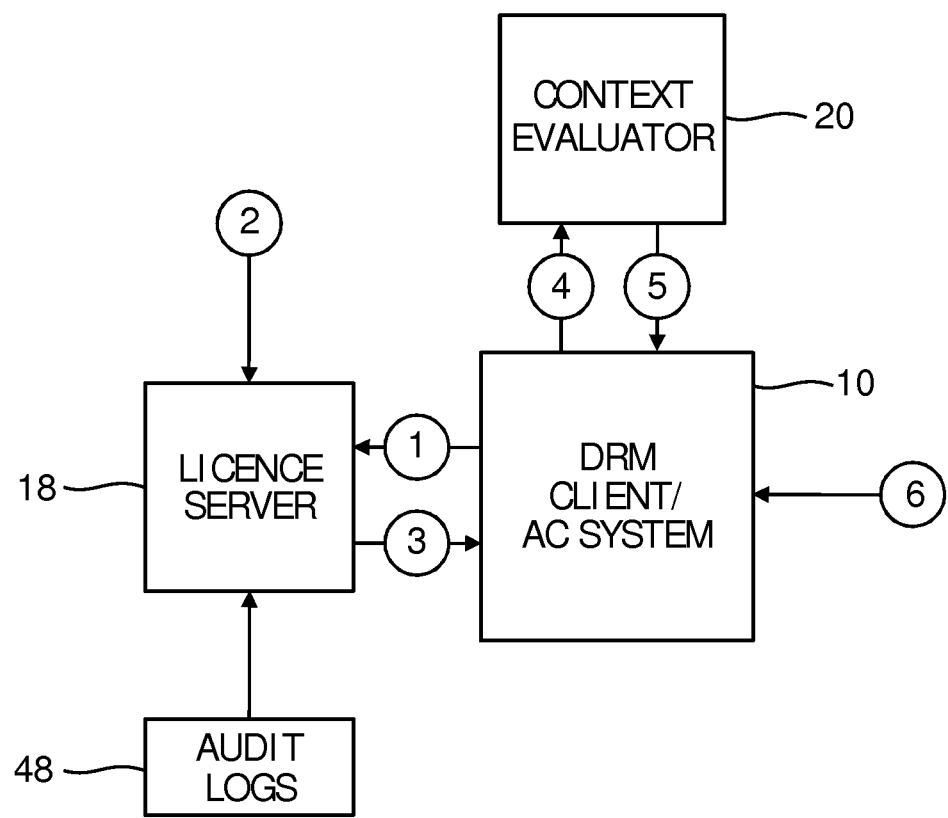
FIG. 9 is a schematic diagram of a further embodiment of the system.

A further embodiment is shown in FIG. 9, in which the license server 18 also has access to audit logs 48. Here a method is used where the access and usage rights of the private electronic health information records or of any other type of sensitive data are dynamically changed based on the behaviour or the reputation of the user that is calculated from the audit logs 48 (or any other source for calculating the reputation of the users in the system) which records all the actions of the user.

FIG. 9 shows this system. At step (1), the DRM client 10 requests from the license server 18 the rights for a particular record. At step (2) the license server 18 minimises the original rights of the user based on their reputation score or behaviour score calculated from the audit logs 48 at the server 18. This is the first level of minimised rights. At step (3), the license server 18 sends the DRM client 10 the first level of minimised usage rights and conditions for the particular record together with the minimisation policy. At step (4), the DRM client 10 requests the trustworthiness of the context information from the context evaluator 20.

The context evaluator 20 assigns the trustworthiness scores to each of the context information from each broad category of the context information and calculates the average trustworthiness score. Alternatively the DRM client 10 can assign these values itself based on other context information. At step (5), the context evaluator 20 forwards the trustworthiness (or certainty score) of the context information to the DRM client 10. At step (6), the DRM client 10 further minimises the rights based on the trustworthiness score and assigns the final minimised rights to the subject for that particular time and for the specific record.

The advantage of this improved embodiment is that in addition to the minimisation of the rights according to context, there is also a minimisation of the usage rights based on the past behaviour (or reputation) of the user, which is equivalent to punishing the user. The usage rights could be modified based on the past behaviour (or reputation) of the user alone, without taking into account the trustworthiness of the context information. Hence in such case, the usage rights will not be further minimised. The minimisation of the rights based on the past behaviour (or reputation) of the user could also be done at the DRM client or PDP of an AC system rather than at the server side.

The invention claimed is:

1. A method of dynamically determining the access rights to a record comprising:
   receiving an access request from a client with respect to the record,
   determining one or more contexts relating to the access request,
   calculating a context score for each determined context, the context score being selected from a plurality of context scores for each context;
   calculating an overall score from the context scores,
   accessing a rights policy for the record, the rights policy defining a plurality of different rights with respect to the record, each with a respective minimum score,
   determining the access rights according to a comparison of the overall score to the score for each right in the rights policy; and
   accessing an audit log defining at least one of prior reputation and prior behavior for the client and minimizing the rights policy according to the audit log; and
   dynamically providing rights access based on the level of trust, a subset of rights comprising one or more of the full set of rights being granted if the level of trust is below a predetermined threshold;
   wherein determining one or more contexts relating to the access request comprises selecting contexts of authentication level, trustworthiness of client and access time of day indicative of whether the access request is urgent.

2. The method according to claim 1, wherein the step of calculating an overall score from tile context scores comprises calculating an average of the context scores.

3. The method according to claim 2, wherein the average is a weighted average according to a predefined formula.

4. The method according to claim 1, wherein the step of determining the client's access rights comprising restricting the client's access rights to fewer than, but at least one of, the total rights defined by the rights policy.

5. The method according to claim 1, and further comprising transmitting a message to the client, the message comprising the client's access rights.

6. The method according to claim 1, wherein the step of calculating a context score for each determined context comprises assigning a descriptive value to each context.

7. The method according to claim 6, wherein the step of calculating an overall score from the context scores comprises applying a rules policy to the descriptive values to obtain an overall score that comprises a descriptive value.

8. A system for dynamically determining the access rights to a record comprising:
   a license server arranged to store a rights policy for the record, the rights policy defining a plurality of different rights with respect to the record, each with a respective minimum score,
   a component arranged to receive an access request with respect to the record, and
   a context evaluator arranged to determine one or more contexts relating to the access request, to calculate a score for each determined context wherein the context score is selectable from a plurality of context scores for each context, to calculate an overall score from the context scores, to access the rights policy for the record, and to determine the access rights according to a comparison of the overall score to the score for each right in the rights policy;
   wherein the license server accesses an audit log defining at least one of prior reputation and prior behavior for a client and minimizes the rights policy according to the audit log;
   wherein the context evaluator dynamically provides rights access based on the comparison of the overall score to the score for each right in the rights policy, a subset of rights comprising one or more of the full set of rights being granted if a score for a given right in the rights policy is below the overall score; and
   wherein the context evaluator is arranged, when determining one or more contexts relating to the access request, to select one or more contexts of authentication level, trustworthiness of client and access time of day indicative of whether the access request is urgent.

9. The system according to claim 8, wherein the context evaluator is arranged, when calculating an overall score from the context scores, to calculate an average of the context scores.

10. The system according to claim 9, wherein the average is a weighted average according to a predefined formula.

11. The system according to claim 8, wherein the context evaluator is arranged, when determining tile client's access rights, to restrict the client's access rights to fewer than, but at least one of, the total rights defined by the rights policy.

12. A method of dynamically determining the access rights to a record comprising:
- receiving an access request from a client with respect to the record,
- determining one or more contexts relating to the access request,
- calculating a context score for each determined context, the context score being selected from a plurality of context scores for each context;
- calculating an overall score from the context scores,
- accessing a rights policy for the record, the rights policy defining a plurality of different rights with respect to the record, each with a respective minimum score;
- determining the access rights according to a comparison of the overall score to the score for each right in the rights policy; and
- transmitting a message to the client, the message describing the client's access rights, which include at least one granted access right; and
- dynamically providing access rights as a function of the overall score and the individual context scores, a subset of rights comprising one or more of the full set of rights being granted if the level of trust is below a predetermined threshold;
- wherein determining one or more contexts relating to the access request comprises selecting contexts of authentication level, trustworthiness of client and access time of day indicative of whether the access request is urgent.

* * * * *